US008464399B2

(12) United States Patent
Herigstad

(10) Patent No.: US 8,464,399 B2
(45) Date of Patent: Jun. 18, 2013

(54) ERGONOMIC ANATOMICAL ASSIST SYSTEM FOR HANDLED DEVICES

(75) Inventor: Byron Jon Herigstad, Dundee, OR (US)

(73) Assignee: Lett Solutions, LLC, Newberg, OR (US)

( * ) Notice: Subject to any disclaimer, the term of this patent is extended or adjusted under 35 U.S.C. 154(b) by 54 days.

(21) Appl. No.: 13/146,847

(22) PCT Filed: Feb. 1, 2010

(86) PCT No.: PCT/US2010/022770
§ 371 (c)(1), (2), (4) Date: Jul. 28, 2011

(87) PCT Pub. No.: WO2010/088623
PCT Pub. Date: Aug. 5, 2010

(65) Prior Publication Data

US 2011/0314639 A1 Dec. 29, 2011

Related U.S. Application Data

(60) Provisional application No. 61/149,287, filed on Feb. 2, 2009.

(51) Int. Cl.
*A47J 45/00* (2006.01)
*B25G 1/10* (2006.01)

(52) U.S. Cl.
USPC .................... 16/430; 16/421; 16/422; 16/424

(58) Field of Classification Search
USPC ............ 16/422, 426, 430, 436, 900, DIG. 12, 16/DIG. 41; 294/25, 58, 26, 51, 57, 50.6, 294/50.8; 135/71, 72, 73, 76, 68; 43/21.2, 43/25, 23; 220/485, 491, 755, 767, 768, 769, 220/776; 99/411–413, 416; 15/144.1, 145, 15/144.3
See application file for complete search history.

(56) References Cited

U.S. PATENT DOCUMENTS 309,437 A 12/1884 Calef
2,516,852 A * 8/1950 Burry et al. .................... 135/71

(Continued)

FOREIGN PATENT DOCUMENTS

FR 2573299 A1 * 5/1986
WO 2010/088623 8/2010

OTHER PUBLICATIONS

PCT International Preliminary Report on Patentability for International Application No. PCT/US2010/022770, dated Aug. 2, 2011 (7 pages total).

(Continued)

*Primary Examiner* — Chuck Y. Mah
(74) *Attorney, Agent, or Firm* — Ganz Law P.C.

(57) ABSTRACT

An ergonomic anatomical assist system for mounting on a handled receptacle device, having a hand grip disposed on a receptacle end of the device, the hand grip disposed on the device transversely to the handle and extending off the handle so that a user's palm can grasp the grip with palm facing up and opposite the receptacle. The system may further have a forearm support configured to cradle around at least a portion of the user's forearm, the support being disposed on a handle portion of the device that is spaced so as to distribute the load of the device over at least two spaced apart anatomical points, one being at the hand and the other along the forearm.

27 Claims, 18 Drawing Sheets

4
X'
36
6
40
26
58
38
10
30
14
X'
16
2

U.S. PATENT DOCUMENTS 2,652,279 A * 9/1953 Morris ........................ 294/50.9
2,710,571 A * 6/1955 Pfister .......................... 172/378
2,817,348 A * 12/1957 Holliday, Jr. .................... 135/71
4,477,114 A * 10/1984 Callis .......................... 294/50.6
4,653,468 A 3/1987 Lemme et al.
4,922,941 A * 5/1990 Daniels .......................... 135/71
D308,457 S 6/1990 Bleller
5,159,775 A * 11/1992 Sutula, Jr. ...................... 43/21.2
5,265,307 A 11/1993 Hull et al.
5,313,735 A * 5/1994 Latouche .......................... 43/25
5,451,085 A 9/1995 Wagner
5,471,698 A * 12/1995 Francis et al. ............... 15/144.1
5,535,484 A 7/1996 Gibson
5,716,087 A 2/1998 Backich et al.
5,774,937 A 7/1998 Caminos
5,802,960 A 9/1998 Graj et al.
5,890,259 A * 4/1999 Sarac .............................. 16/422
6,082,795 A * 7/2000 Fornelli .......................... 294/58
D429,626 S * 8/2000 Hearn et al. ................... D8/367
6,398,066 B1 6/2002 Mullins
6,464,272 B1 10/2002 Michaud
6,564,389 B1 * 5/2003 Laughlin ........................... 2/158
6,598,266 B1 7/2003 Elliott
6,698,064 B1 3/2004 Graj et al.
D509,034 S 8/2005 Morelock
7,284,301 B2 10/2007 Czuwala
7,341,162 B2 3/2008 Svabek et al.
D583,637 S 12/2008 Phillips
7,775,156 B2 8/2010 Sus et al.
2002/0104844 A1 8/2002 Morelock
2006/0174449 A1 8/2006 Hughes
2007/0204435 A1 9/2007 Pangborn
2008/0223424 A1* 9/2008 Hollier ............................ 135/71
2011/0210572 A1* 9/2011 Rockwell ..................... 294/54.5
2011/0223305 A1* 9/2011 Cohen ........................... 426/512

OTHER PUBLICATIONS

PCT International Search Report and Written Opinion for International Application No. PCT/US2010/022770, dated Feb. 1, 2010 (12 pages total).

'Hand Held Spreader : Scotts HandyGreen II', [Online] Retrieved from the <URL: http://www.scottsprofessional.com/en/range/35>; visited on Jan. 23, 2009. (screen shot of 2 pages).

* cited by examiner

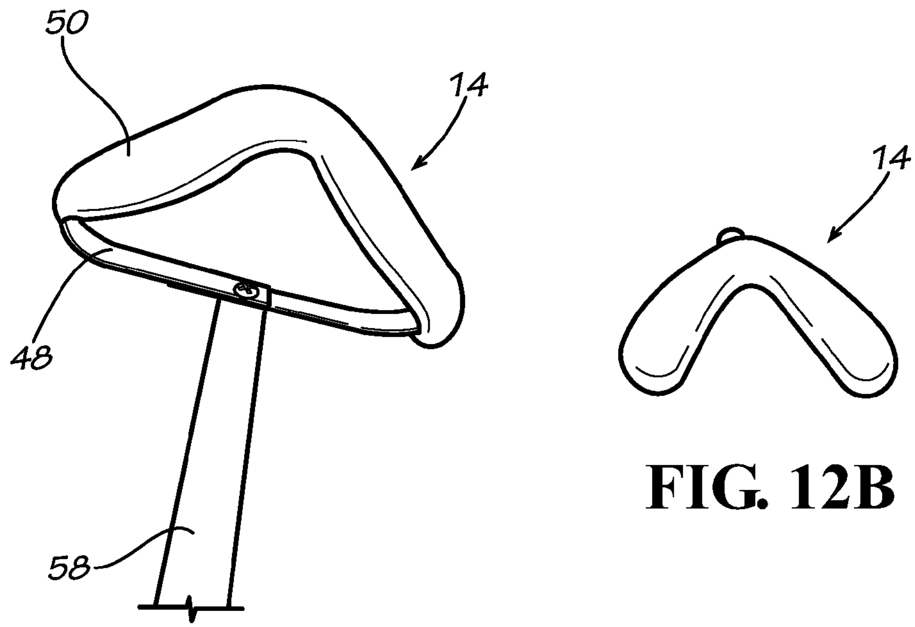
FIG. 12A
FIG. 12B
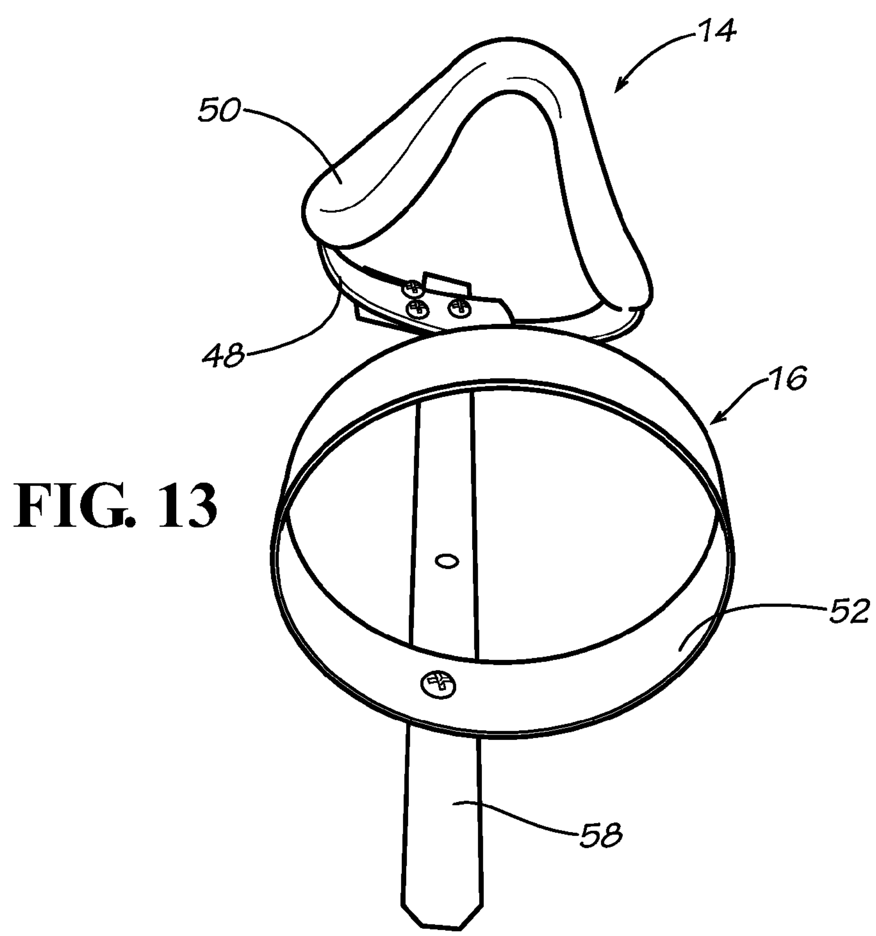
FIG. 13

ERGONOMIC ANATOMICAL ASSIST SYSTEM FOR HANDLED DEVICES

RELATED APPLICATIONS

This application claims priority to and the benefit of U.S. provisional patent application No. 61/149,287, filed on Feb. 2, 2009, entitled ERGONOMIC ANATOMICAL ASSIST SYSTEM FOR HANDLE DEVICES, the content of which is hereby incorporated by reference as if recited in full herein for all purposes.

BACKGROUND

The inventive subject matter disclosed herein is directed to an ergonomic anatomical assist system for mounting on a handled device that is lifted and manipulated using hand and arm. The inventive subject matter provides for a hand grip and forearm support for securely gripping handled devices, such as fryer baskets, pasta bins, pans, fishing nets, dust pans, etc., while also reducing stress on the hand, wrist, and forearm.

For illustrative purposes, the inventive subject matter is described below referring to a handled receptacle device, such as a fryer pan or deep-fryer basket. However, a handled receptacle device may refer to anything that has a handle for lifting or tilting by hand and arm and has a receptacle end attached to the handle for holding something or manipulating something, for example, fly bins, strainers, pots, pans, spoons, ladles, spatulas, fishing nets, etc.

People are often required to perform repetitive tasks involving the lifting or manipulating of handled devices. For example in commercial kitchens, the preparation of fried food products or pasta requires repetitive movements of lifting, tilting, shaking, dumping the products out of the receptacle and replacing the receptacle to its original position. Repeated shaking of the receptacle may be desirable to remove excess oil. These repetitive motion tasks are performed daily in restaurants, institutional kitchens, and fast food establishments for cooking a variety of food products, such as French fries, fish, fried chicken, etc. The food products are usually placed in a basket before being towered in a fryer vat of hot oil or boiling water. The baskets usually have a handle for lifting the basket from the vat. The weight of empty or full baskets can place stress across hand and arm joints and supporting muscles, tendons, and ligaments.

Examples of handles for flyer baskets are described in U.S. Pat. No. 6,398,066 and D308,457. These handles have no ergonomic considerations and may put considerable strain on the user's anatomy. Some handles have a silicone type coating to the wire based handles to make them more comfortable to grip. However, they only consider contact stresses and do nothing to distribute stresses more optimally across hand and arm. Nor do they help orient the hand and arm in a more optimal arrangement for minimizing stress on the anatomy.

Repetitive movements involving the use of receptacles may also occur in other settings, such as the handling of fish with fishing nets or painters using paint rollers.

Job tasks that involve highly repetitive grasping and manipulating activities or specific wrist postures involving heavy lifting are associated with medical conditions, such as Carpal Tunnel Syndrome whereby the median nerve is compressed at the wrist leading to numbness and muscle weakness in the hand. Other conditions that are associated with repetitive motions of the wrist include tennis elbow, De Quervain's syndrome, extensor or flexor tendinitis, and contact stresses on hand and fingers. Additionally, any forceful and repetitive use of the hands and wrists can cause upper extremity pain.

Accordingly there is a need for an ergonomic anatomical assist system that assists a person in lifting and manipulating a handled receptacle device and that more optimally distributes stress across the user's anatomy and/or more optimally orients the anatomy.

SUMMARY

In certain possible embodiments, the inventive subject matter is directed to an ergonomic anatomical assist system for mounting on a handled receptacle device, including a hand grip mountable on a receptacle end of the device, the hand grip mounting on the device transversely to the handle and extending off the handle so that a user's palm can grasp the grip with palm facing up and opposite the receptacle. The system further includes a forearm support configured to cradle around at least a portion of the user's forearm, the support being mountable on a handle portion of the device that is spaced so as to distribute load of the device over at least two spaced apart anatomical points, one being at the hand and the other along the forearm. In the foregoing embodiment, the forearm support may mount on the handle no that it braces the load from the receptacle when the user while grasping the grip rotates the receptacle at least 90° towards an inverted position. In the foregoing embodiment, the hand grip angles inwardly or outwardly and/or upwardly or downwardly relative to the handle, for example, inwardly and/or downwardly at an acute angle(s). In the foregoing embodiment, the hand grip may be oriented to receive a right hand, or a left hand, or may have left and right grip portions for receiving a right hand or a left hand on a respective right or left portion. In the foregoing embodiment, the hand grip may be coupled to the forearm support, and the coupled structure is mountable on the handle. In the foregoing embodiment, the hand grip, handle, and forearm support form a one-piece structure. In the foregoing embodiment, the forearm support and the hand grip are adjustable relative to the longitudinal axis of the handle. The forearm support may further have a substantially U-shape. In the foregoing embodiment, the hand grip may be formed of a heat-resistant material suitable for use in cooking, such as stainless steel. In the foregoing embodiment, the system may further include a sleeve coupling the hand grip and the forearm support to the handle of the receptacle. In the foregoing embodiment, the hand grip and forearm support may form a unitary piece with the receptacle, for example the hand grip and forearm support may be formed of a filamentous structure, such as a stainless steel wire. In the foregoing embodiment, the hand grip may include a coiled or a looped filament. In the foregoing embodiment, the hand grip may include a filamentous structure that is narrower at the center of the hand grip and wider at the free end of the hand grip.

In another possible embodiment, an ergonomic anatomical assist system for mounting on a handled receptacle device, may include a hand grip mountable on a receptacle end of the device, the hand grip mounting on the device transversely to the handle and extending off the handle so that a user's palm can grasp the grip with palm facing up and opposite the receptacle.

In another possible embodiment, the inventive subject matter is directed to a handled receptacle device having a hand grip disposed on a receptacle end of the device, the hand grip disposed on the device transversely to the handle and extending off the handle so that a user's palm can grasp the grip with the palm facing up and opposite the receptacle, and the hand grip comprising angled grip portions for receiving a right hand or a left hand on a right or left portion. The device may further have a forearm support configured to cradle around at least a portion of the user's forearm, the support being disposed on a handle portion of the device that is spaced so as to distribute load of the device over at least two spaced apart anatomical points, one being at the hand and the other along the forearm and wherein the forearm support is disposed on the handle so that it braces the load from the receptacle when the user, while grasping the grip rotates through the receptacle at least 90° towards an inverted position.

The inventive subject matter is further directed to a kit including a handled receptacle device, and at least one ergonomic anatomic lift system. The inventive subject matter is farther directed to a kit including one or more additional hand grips or forearm supports.

The inventive subject matter further contemplates a method for making such an ergonomic anatomical assist system, including providing a hand grip mountable on a receptacle end of a receptacle device, the hand grip mounting on the device transversely to the handle and extending off the handle so that a user's palm can grasp the grip with palm facing up and opposite the receptacle. The method further includes providing a forearm support configured to cradle around at least a portion of the user's forearm, the support being mountable on a handle portion of the device that is spaced so as to distribute load of the device over at least two spaced apart anatomical points, one being at the hand and the other along the forearm.

The inventive subject matter further contemplates a method for using an ergonomic anatomic assist system, including grasping a hand grip on a receptacle end of a device with a hand while a forearm is placed in a forearm support, lifting the receptacle, lifting and turning the hand and arm about 90° so that the receptacle is tilted, rotating the hand and arm further about 90°-180° to sufficiently turn the receptacle so that the content of the receptacle is unloaded. The hand grip may be adapted to hold the hand and wrist of the person in a neutral or substantially neutral position during all phases of manipulating the receptacle so that stress on the hand, wrist, and forearm of the person is reduced.

In any of the foregoing embodiments, the handled device may include a fry-basket.

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The following figures show embodiments according to the inventive subject matter, unless noted as showing prior art.

FIGS. 12A, 12B, and 13 show other possible embodiments of an ergonomic system.

DETAILED DESCRIPTION

Figure 1:
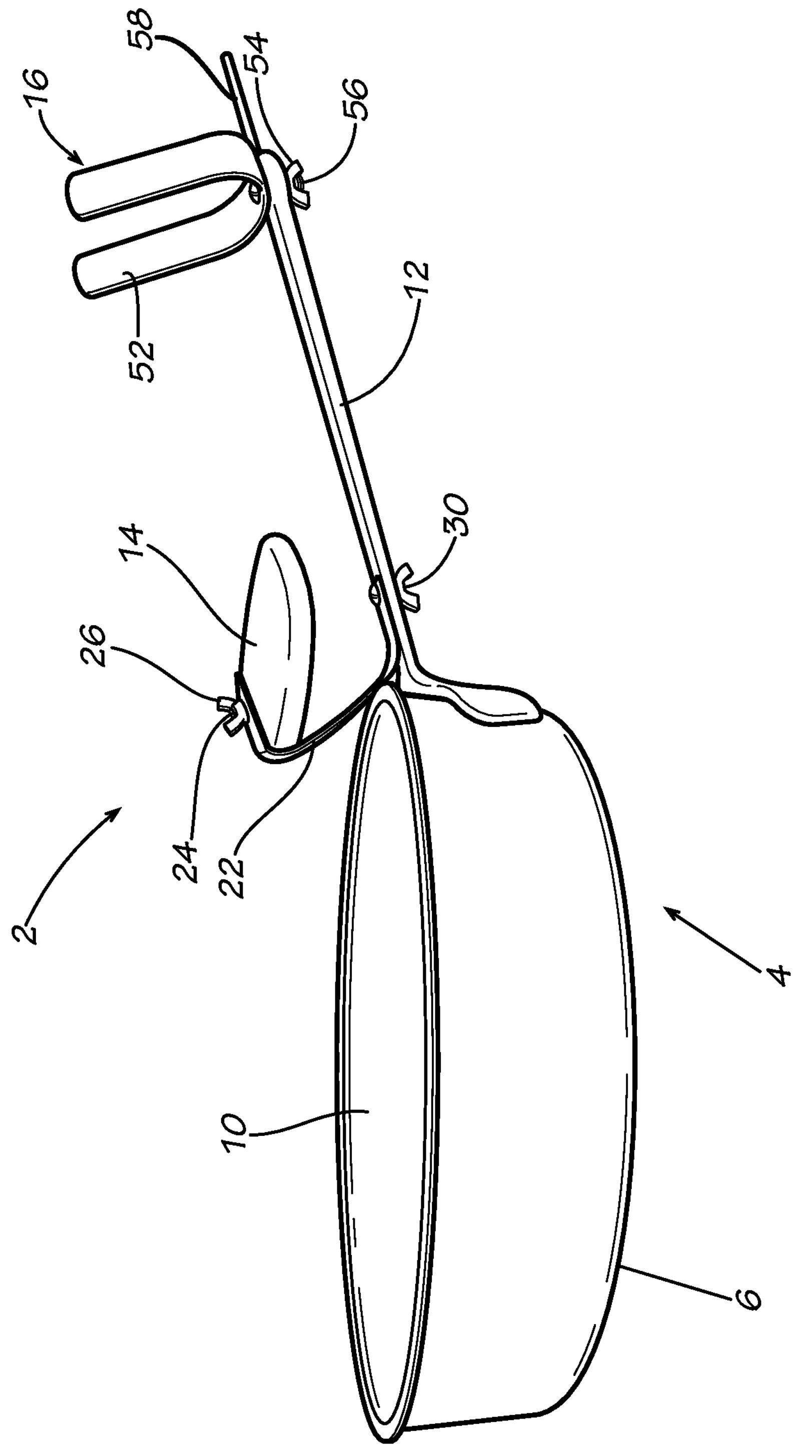
FIGS. 1-4 show different views of an ergonomic system as used in combination with a frying pan.
Figure 2:
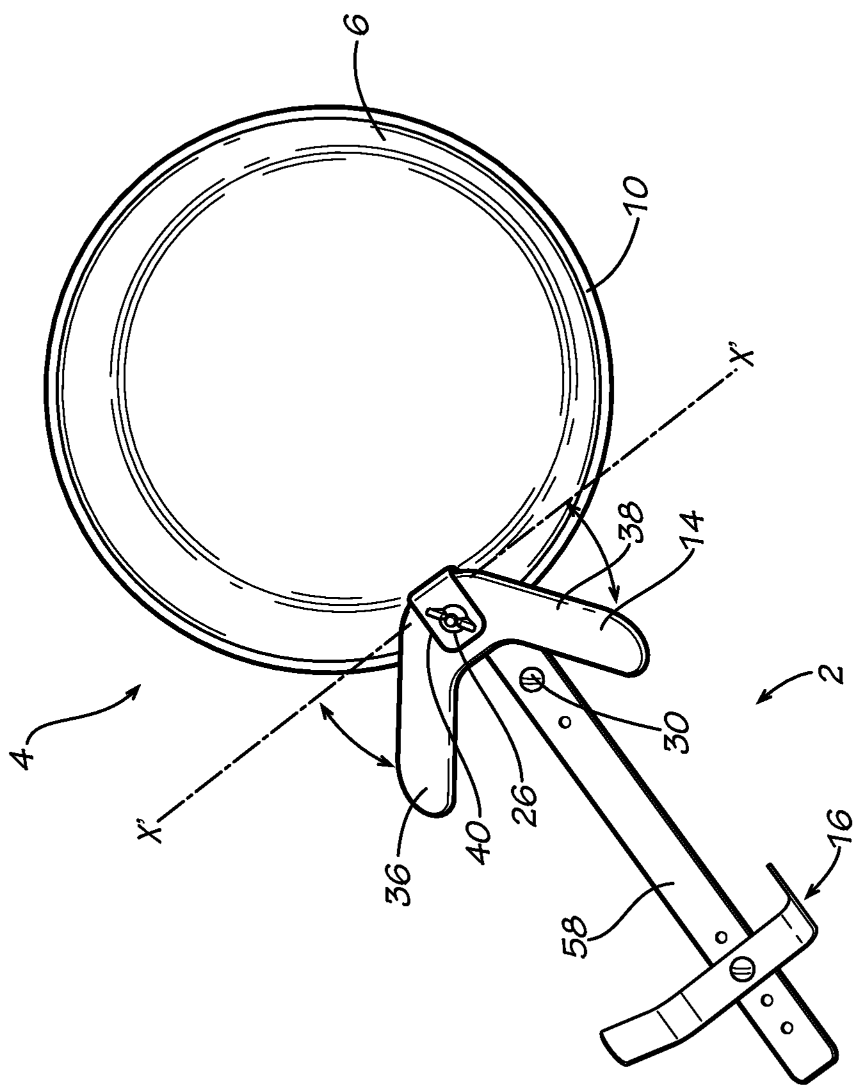
Figure 3:
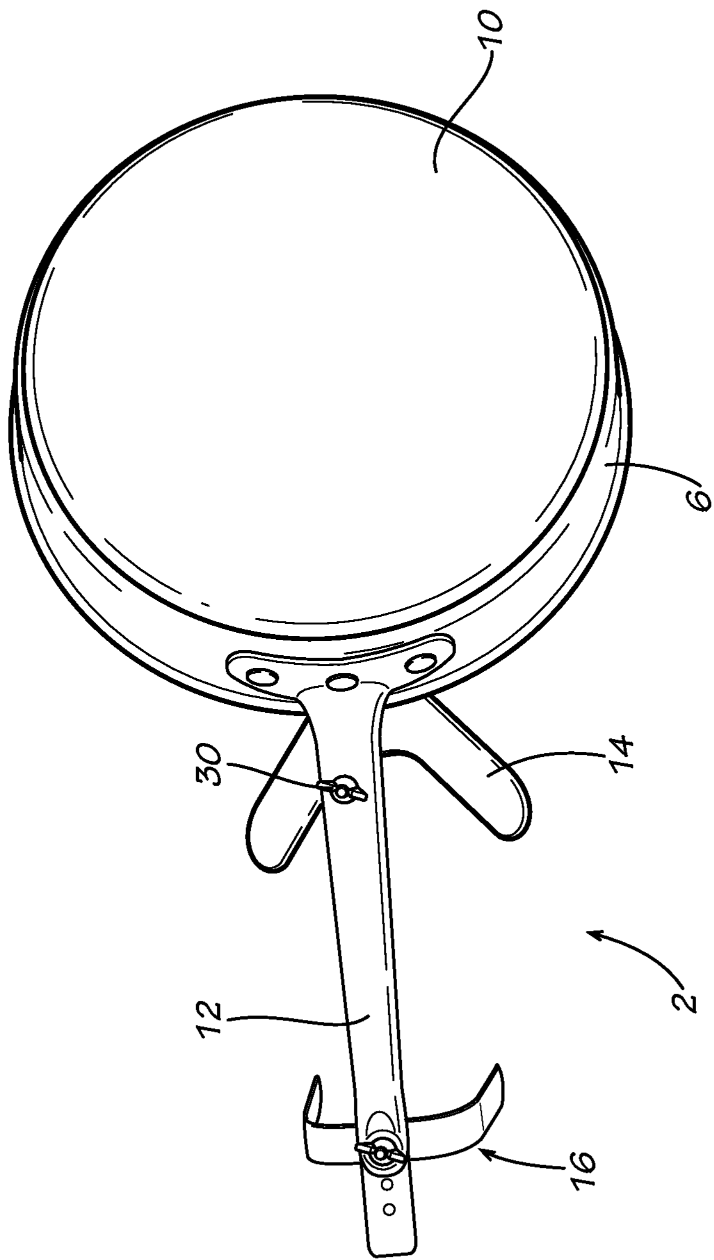

Representative embodiments according to the inventive subject matter are shown in FIGS. 1-20, wherein the same or generally similar features share common reference numerals.

The inventive subject matter is directed to an ergonomic anatomical assist system for mounting on a handled receptacle device. The system includes a hand grip and a forearm support. The hand grip may be mounted on a receptacle end of the device, which may be a direct mount on the receptacle itself or may be on the handle at or near the receptacle. The hand grip may be mounted on the device transversely to the handle and extending off the handle so that a user's palm can grasp the grip with the palm facing up and opposite the receptacle. The forearm support may be configured to cradle around at least a portion of the user's forearm. The support may be mountable on a handle portion of the receptacle device that is spaced so as to distribute load of the device over at least two spaced apart anatomical points, one being at the hand and the other along the forearm. In some embodiments, the forearm support mounts on the handle so that it braces the load from the receptacle when the user white grasping the grip rotates the receptacle through at least 90° towards an inverted position, and more preferably through a full 180° of rotation, without having to abduct the shoulder.

As used herein, the words "handled receptacle device" refer to a tool that has a handle for lifting, tilting, or otherwise manipulating by hand and arm and has a receptacle end attached to the handle for holding something or manipulating something. Representative handled receptacle devices include fry bins, strainers, pots, pans, spoons, ladles, spatulas, fishing nets, etc. The inventive subject matter is not limited to restaurant or kitchen devices hut can also be adapted for other devices and tools, particularly where the user my make a lifting and rotational movement with the hand and arm. For example, this might be done repetitively by a janitor using a dust pan or a painter using a paint roller. In these examples, the pan and roller portions of the devices may be considered the receptacles. In other examples, a fish net for removing fish from fish tank may be considered a handled receptacle device.

Figure 21:
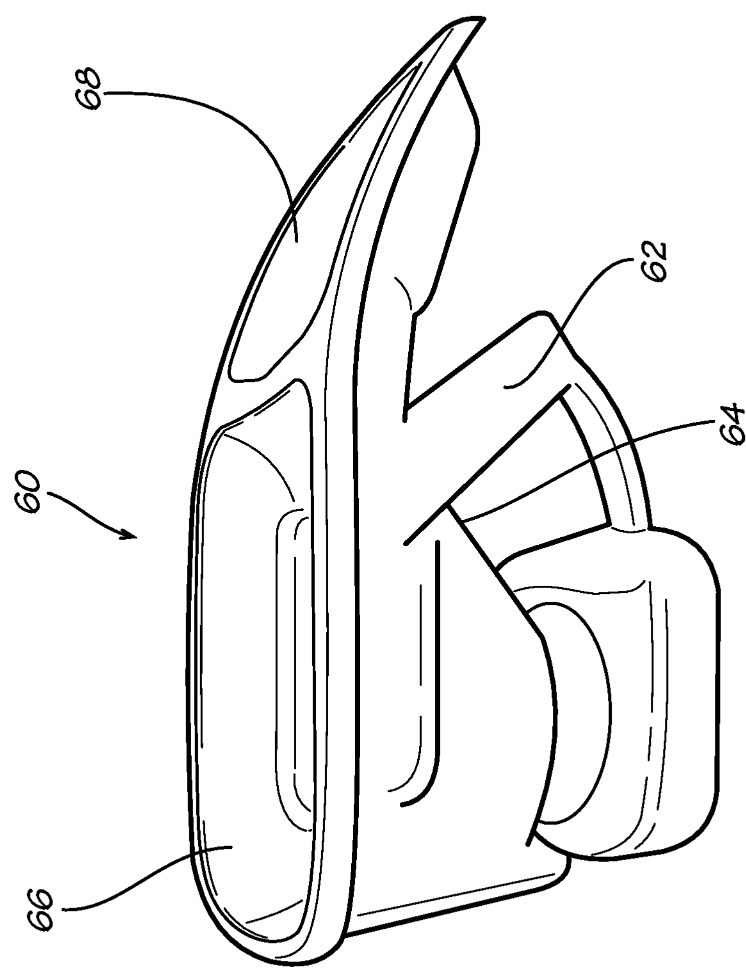
FIG. 21 shows an ergonomic system according to the prior art.

An example wherein a hand held device reduces wrist fatigue is commonly used in lawn care. A hand-held spreader 60, such as commercially available from Scotts™ and shown in FIG. 21, is often used for small applications of lawn fertilizer, grass seed or ice melt. The hand grips a handle 62 that has an adjustable element 64 regulating the granulate flow from the trough 66. The device 60 also support the forearm with a cradle 68. In this device, however, the hand grip is not mounted transversely to the handle. Moreover, a user's palm cannot grasp the grip with palm facing up and opposite the receptacle. The hand grip is positioned below the forearm support and does not provide an angled V-grip. These devices are often used for dispersing granulates and are usually not rotated repeatedly towards an inverted position. The handle system of the inventive subject matter disclosed herein may be applied to hand-held spreaders as well.

In the embodiment shown in FIGS. 1-20, an ergonomic anatomical assist system 2 is mounted on a handled receptacle device 4, such as a frying pan 6 shown in FIGS. 1-5 or a deep-fryer basket 8 shown in FIGS. 6-11.

Handled receptacle device 4 usually includes a receptacle 10 for holding food items and a handle 12 for holding the receptacle. The handle may be permanently attached or removable connected to the receptacle, or to a portion of the handle near the receptacle. A hand grip attached on or near the receptacle is attached at the "receptacle end" of the device.

Ergonomic system 2 includes a hand grip 14 and a forearm support 16. FIGS. 1-20, show a hand grip 14 having a general V- or U-shape or shape that ergonomically fits a hand.

Hand grip 14 has legs 36 and 38 extending off the handle an yards the user and a central part 40 facing receptacle 10. Legs 36 and 38 should extend far enough into the palm to make a wide comfortable grip and allow control of the upward and downward movement of the receptacle without having to flex or extend the wrist. Additionally, legs 36 and 38 allow holding hand grip 14 with either the left hand or the right hand. This gives the user the option to use either hand. For example, users that work in a restaurant may alternate between hands when they are in a hurry. In other embodiments, the hand grip my have any shape that provides a secure grip for the hand. In some embodiments the grip may be oriented to place the hand and the wrist of the person in a neutral position during all phases of lifting, placing, and dumping the contents of the receptacle, as described below.

Hand grip 14 may be disposed on or at a desired distance from receptacle 10, for example, to keep the hand at a safe distance of a hot surface. The hand grip may be oriented for a mounting to receive a right hand or a left hand or either one of a right and left hand.

Hand grip 14 may be formed on the handle or receptacle or otherwise coupled to either with any type of fastener or bonding agent (e.g., adhesives, welding, soldering) or other attachment means. For example, as shown in FIGS. 1-5, a bar 22 is attached to hand grip 14 by a vertical bolt 24, running through the center of hand grip 14, and awing nut 26. Bar 22 may be bent and attached to handle 12 of receptacle 10 by a fastener, for example a nut and bolt fastener 30 or a clamp. Bar 22 may provide for hand grip 14 to be held at a certain height above handle 12 or receptacle 10.

Figure 7:
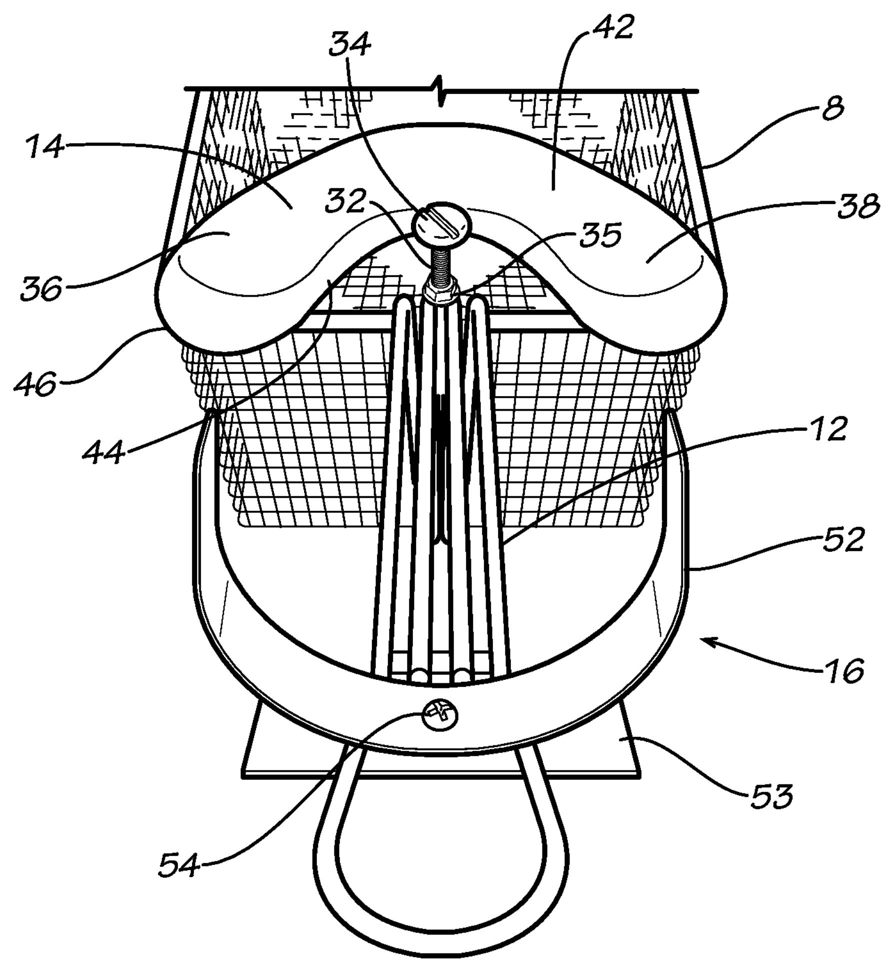
Figure 8:
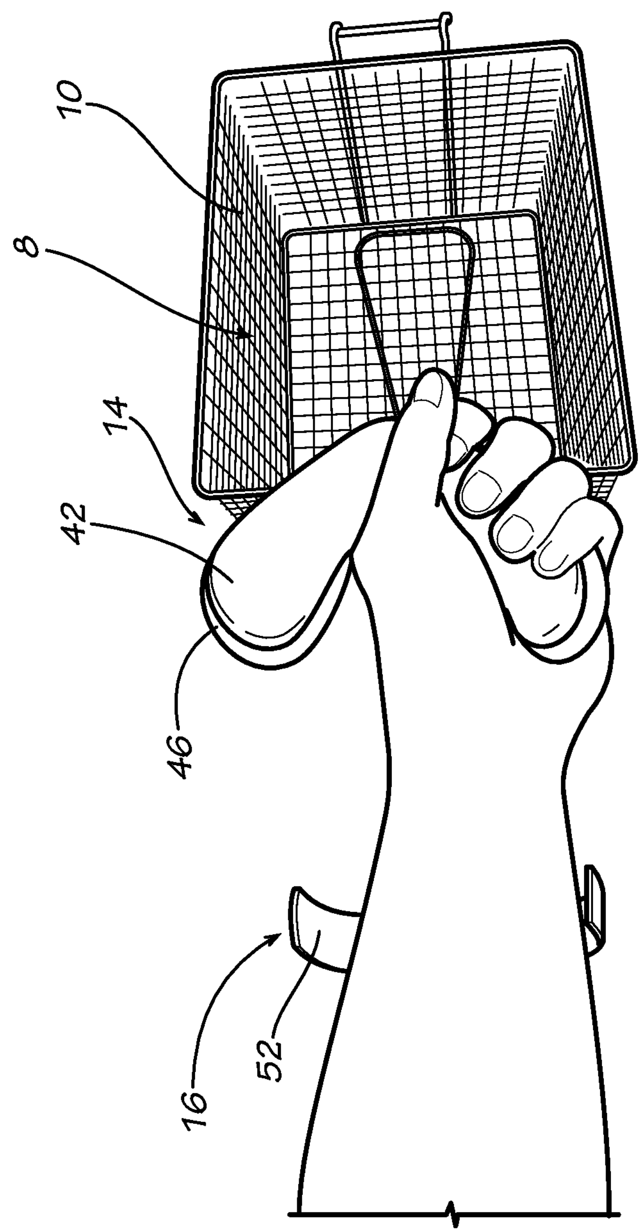

FIG. 7 shows another embodiment of an ergonomic system, wherein hand grip 14 is connected to a bar 32 by a horizontal bolt 34. Bar 32 is further attached to handle 12, for example, by a vertical bolt 35 or by a clamp. In other embodiments, the hand grip may be positioned at the side or below the handle of the receptacle. The hand grip may be supported form the sides in a flat triangular style that attaches to the handle, or it may attach or be continuous with a bar coming up from the base and going into the front end of the hand grip. It is understood that there are many variations in connecting the grip element to the handle or receptacle.

Figure 4:
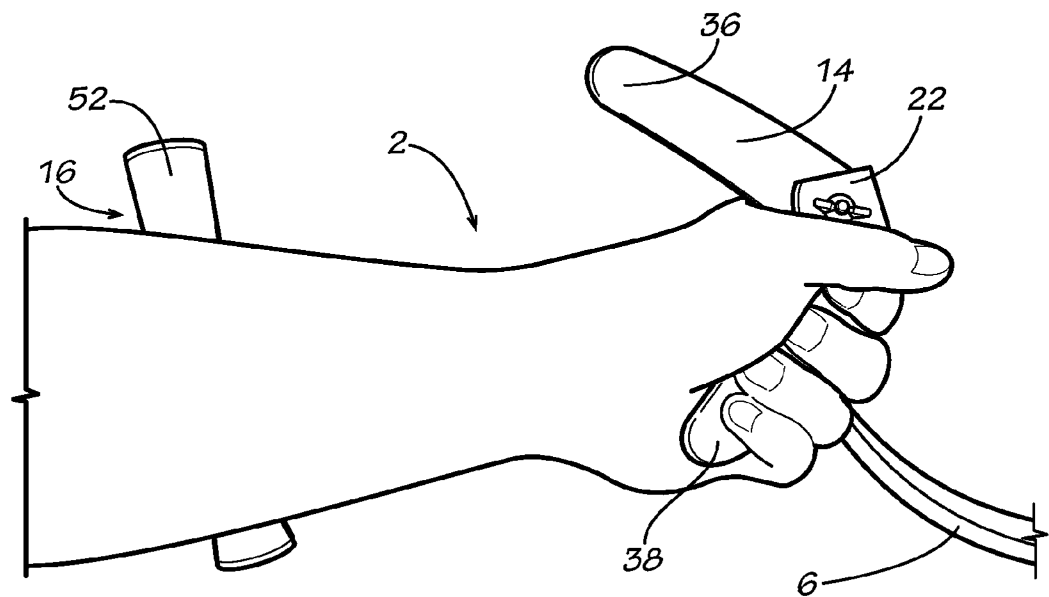

FIGS. 1-4 show hand grip 14 having legs 36 and 38 extending inward at an angle relative to an axis X-X through the central part 40 of hand grip 14. The hand grip may also be angled upwardly or downwardly relative to a horizontal plane generally capturing the handle or receptacle. The angle may be adjusted to keep the hand and wrist of the user in a neutral position. A neutral position of the wrist is defined as a position wherein the wrist/hand is in a grip position and in slight dorsiflexion of the wrist. This is the general posture the wrist and hand assume when at rest, as shown in FIG. 4, for example. As used herein an acute angle refers to the angle of hand grip or the legs of the hand grip at which the hand and wrist of the user are in a neutral position when the user grasps the hand grip.

The angle of the hand grip may have an optimal range extending downward between 10° and 45°. Furthermore, the angle may vary depending upon the application it is used for. For example, there is less downward angle on a fry or pasta bin, because these receptacles have to be nearly completely inverted to dump the contents without transferring the downward rotation into abduction of the shoulder. In other applications, such as for a large gourmet fry pan or cast iron pan, there may be no need to completely dump the contents because the pan is tilted at most to 90° from horizontal and the contents is slid out instead. In this case, the downward angle can be greater and the forearm does not have to supinate as far for holding, lifting, and moving the pan.

Figure 5:
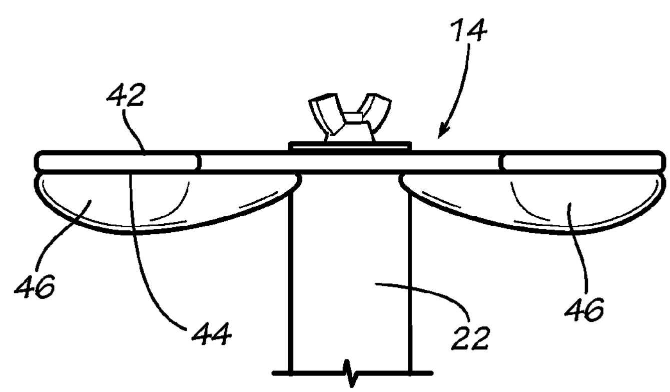
FIG. 5 shows another embodiment of an ergonomic system as used in combination with a frying pan.
Figure 6:
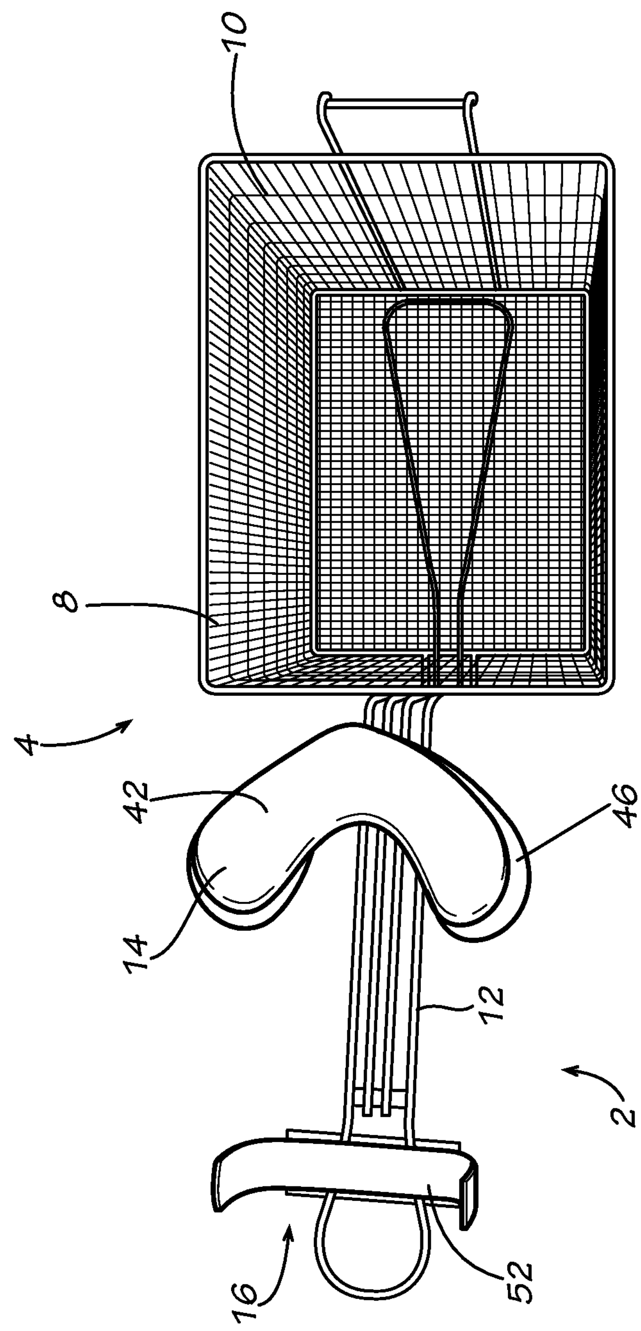
FIGS. 6-8 show different views of an ergonomic system as used in combination with a deep-fryer basket.

In other embodiments, for example as shown in FIG. 5, hand grip 14 has a top surface 42 extending in a horizontal plane, and a bottom surface 44 having padding 46, being formed or shaped to the hand/palm, providing the hand with an angled grip and allowing the wrist to remain in a neutral position. In some embodiments, hand grip 14 may be narrower at its center or rounded part and wider at the free end, for example, as shown in FIGS. 12A and 12B. Such a hand grip provides for a wider grip in the palm of the hand than between the thumb and index finger, thereby helping to reduce strain on the hand and wrist by increasing stability and decreasing the grip required.

Hand grip 14 may be made of molded plastic, metal, or any other suitable material. Furthermore, hand grip 14 may be provided with several openings and recesses to accommodate different features of the system. For food preparation or service applications, the hand grip should be washable and heat resistant.

Figure 20:
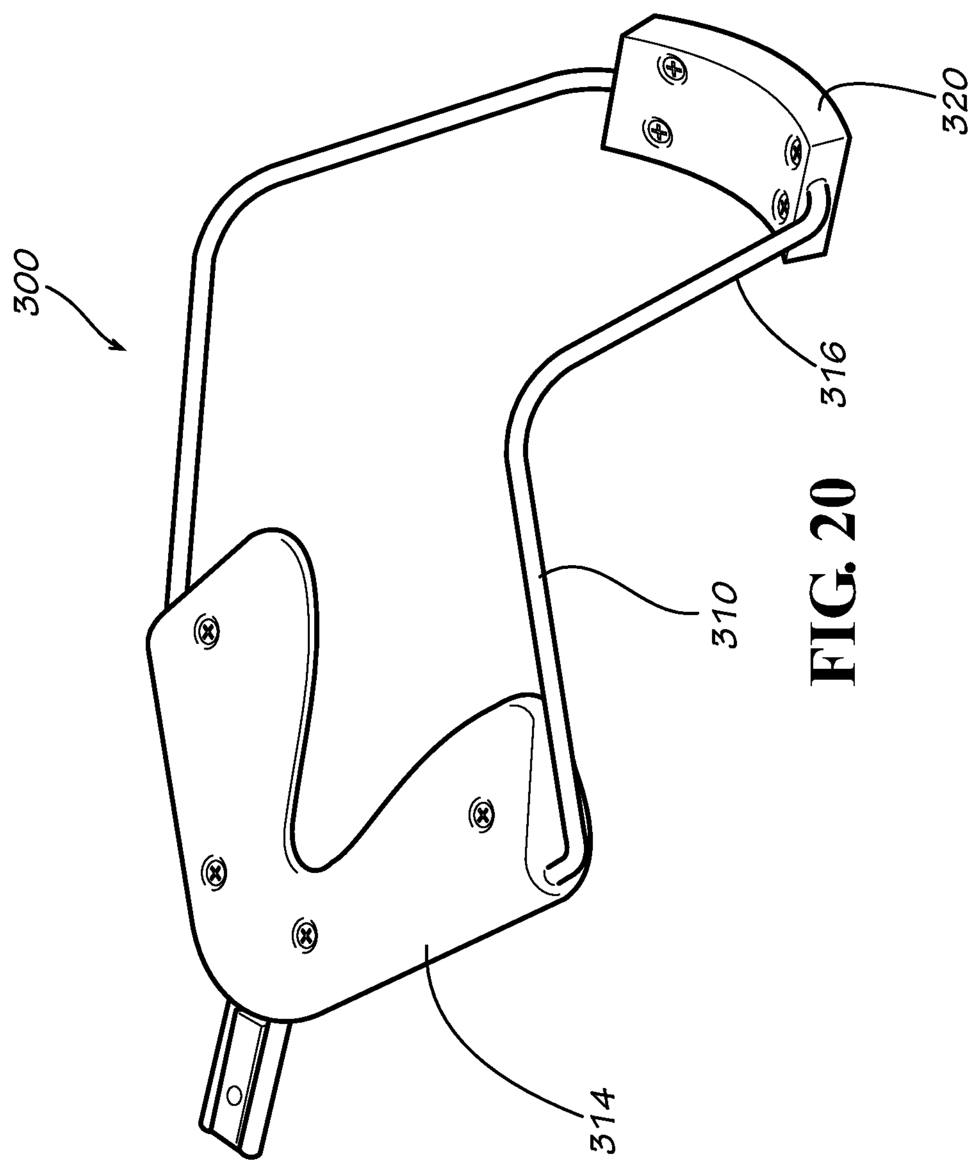
FIG. 20 shows another possible embodiment of an ergonomic system.

In other embodiments, for example as shown in FIGS. 12A and 13, hand grip 14 is designed as a closed loop 48. In this representative example, the loop is formed of a bent piece of metal, such as aluminum or stainless steel, of about 6 inches wide. The hand grip is rounded at the top, bent inward about 45° and downwardly about 20°-30° from horizontal. In some embodiments, loop 48 may be covered with a padding material 50, such as a heat resistant plastic molded ergonomically to the hand. It should be appreciated that the closed loop is not limited to the foregoing dimensions but may be formed of other materials and dimensions. FIG. 20 shows another example of an ergonomic anatomical assist. System 300 has a hand grip 314 formed of a solid piece of material, for example molded plastic, and is shaped to provide an ergonomic grip for the right hand or left hand of a user. A wire frame 310 extends from hand grip 314 towards forearm support 316. Frame 310 and forearm support 316 are shaped ergonomically to optimally support the forearm of the user. Optionally, forearm support 316 may have a support portion 320, for example a curved piece of molded plastic, that distributes the forces that are applied to the forearm.

The ergonomic anatomical assist system 2 may further include a forearm support 16 having a support frame 52 to hold a forearm of the person and to distribute force onto the forearm and not just the wrist. Support frame 52 for the proximal forearm transfers much of the stress onto the forearm and larger muscle groups thereby decreasing the likelihood of overuse and strain. Frame 52 may be connected to handle 12 of receptacle 10 at a position proximal of hand grip 14 anywhere between the elbow and the wrist, and may be adjustable along the handle to suit individual needs and comfort.

Frame 52 has a shape that cradles some or all the way around a user's arm. Frame 52, shown in FIGS. 1-4 and 6-11, has a general U-shape. However, in other embodiments, the frame may have a groove or a loop that supports the forearm. For example, as shown in FIG. 13, frame 52 is circular or cylindrical shaped, where a loop of about 4 inches diameter is positioned on a base bar 53 that also holds a hand grip. The loop may be placed about 6 to 10 inches from the hand grip, for typical needs.

Frame 52 may be formed on or otherwise coupled to handle 12. For example, it may be coupled using a known fastener, such as nut 54 and bolt 56. However, frame 52 may be attached by any other suitable fasteners, such as a snap-fit mechanism. Or it may be bonded to the handle using adhesive or welding or soldering.

In an open U-shaped frame, a user may remove its arm quickly from the support if needed, for example for safety reasons. The U-shaped frame is wide enough to accommodate larger forearms without changing the system. In some embodiments, the frame could be made from a flexible material so that a larger or smaller person may accomplish a custom fit for themselves by bending the support slightly. The U-frame may be attached directly by fixing the frame to the back end of the handle. In other embodiments, the frame may attach to a unit that combines fixation for both the hand grip and the forearm support.

The combination of hand grip 14 and forearm support 16 assist in holding the hand and wrist of the person in a neutral position without adding stress to the forearm and shoulder and reduce the effort to lift and tilt the handle of the receptacle.

Ergonomic system 2 optionally may have several adjustability features. For example, hand grip 14 and forearm support 16 may be moveable relative to each other along the longitudinal axis of the handle, and/or around the longitudinal axis of the handle, and/or in terms of relative height to each other. Additionally, hand grip 14 may be moved radially up or down relative to the longitudinal axis of the handle. The grips may also be adjustable in terms of inward/outward or upward/downward angles.

If used in the design of the handle, the base bar 53 for forearm support 16 could provide for a plurality of positions of attachment for both the hand grip and height and proximal/distal relationship of the forearm support, giving more variability to the individual preferences.

Another possible embodiment of an ergonomic anatomical assist system is shown in FIGS. 14-17. The system 70 includes a sleeve 72 that is used in combination with a frying pan 74. The sleeve 72 slides over handle 76 and allows the system to be easily removed or attached to a handle 76 of frying pan 74. The sleeve 72 couples a hand grip 78 and forearm support 80 to handle 76. Forearm support 80 provides pressure distribution points to the forearm, for example in a U-shaped form or a looped form. Sleeve 72 may be coupled to handle 76 with fasteners, such as adjustable screws 82 and 84 that apply pressure to the undersurface of handle 76 to hold sleeve 72 and forearm support 80 in place. In the example shown, screw 82 distributes pressure on handle 76 at point A, which is close to pan 74, and screw 84 couples sleeve 72 to handle 76 at point B. Additionally, forearm support 80 may be coupled to sleeve 72 and/or handle 76 by any suitable fasteners. In other embodiments, the forearm support may be integrated with the sleeve, for example as a single molded piece that is coupled to a handle of a pan. In some embodiments, the system may be formed as a one piece unit incorporating the sleeve, forearm support, and grip element. In other embodiments, a sleeve may be used in combination with varying shapes of the hand grip and forearm support, such as a system whereby the hand grip gradually transitions into a forearm support, for example as with a trough-shaped or looped hand grip integrated with the forearm support.

Figure 18:
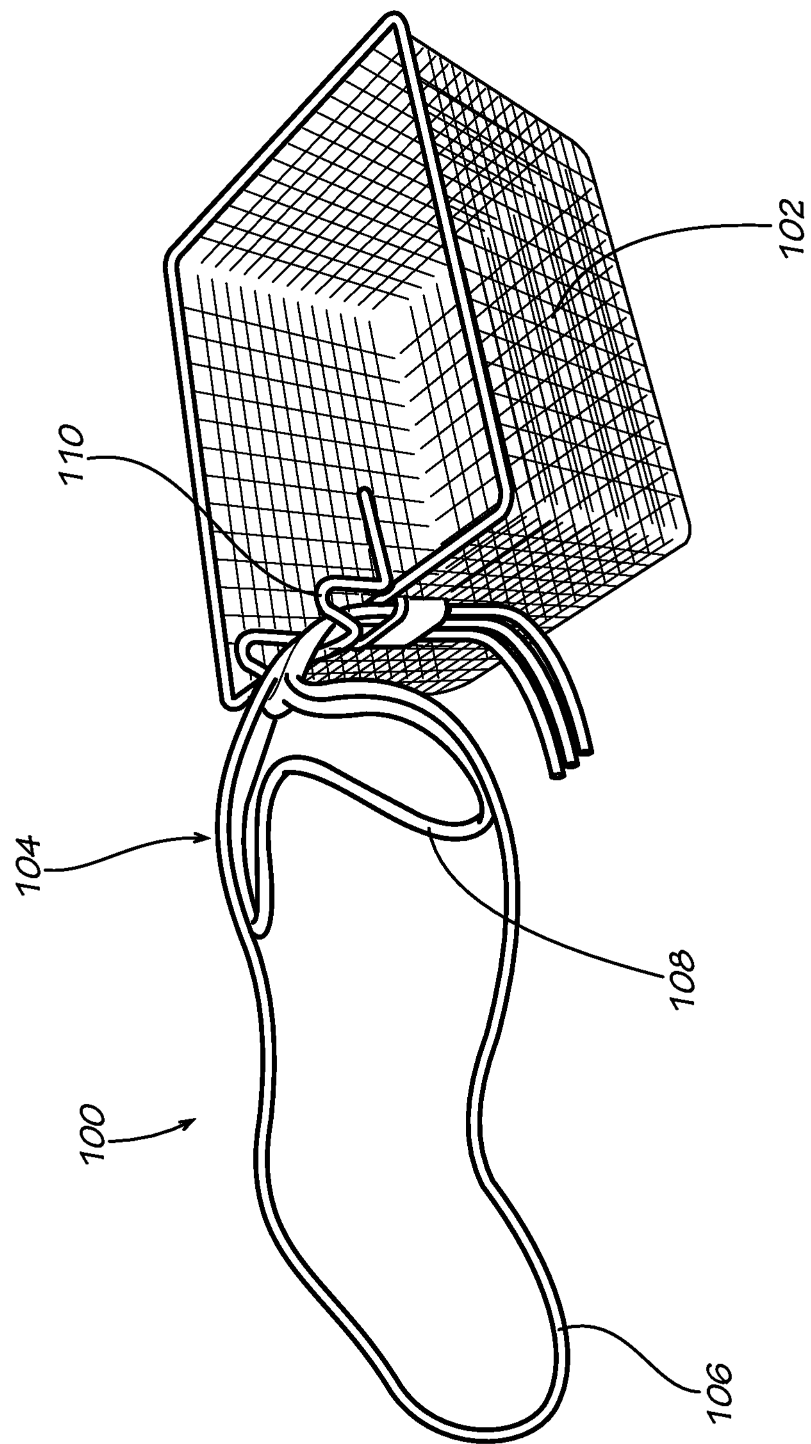
FIG. 18 shows different views of another embodiment of an ergonomic system as used in combination with a fryer basket.
Figure 19:
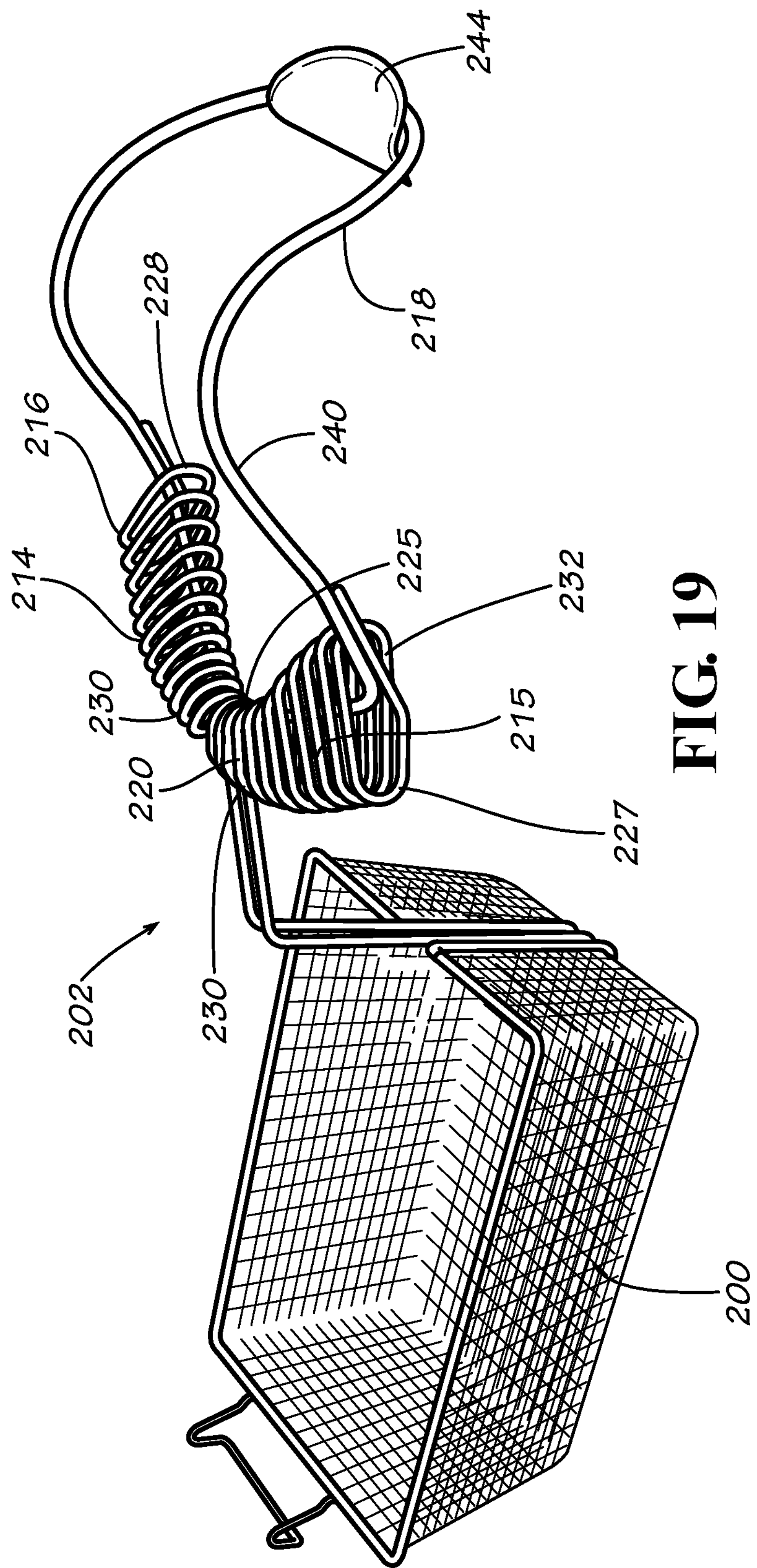
FIG. 19 shows another embodiment of an ergonomic system as used in combination with a frying basket.

In another possible embodiment, an ergonomic system may be formed of relatively rigid filaments or string-like pieces of a malleable material that can be shaped into a hand grip and forearm support example, FIG. 18 shows a system 100 formed of a metal wire and coupled to a fryer basket 102. System 100 is attached to fryer basket 102 with a fastener 110, such as a clamping system or a nut and bolt system. In other embodiments, the system 100 may be formed as a monolithic piece with the fryer basket 100. System 100 provides a handle 104 by bending wire into a shape that angles with the hand, spreads out the force in the palm of the hand, and provides a support 106 for the forearm. For example, a wire of stainless steel or copper may be bent into an angled hand grip 108 integrated with a forearm support 106 and extending backward 6-12 inches from hand to forearm. Such a filamentous construction allows for easy sanitizing of the system. Additionally, the particular shape of the system allows for convenient stacking of the fryer baskets. In other embodiments, the system 100 may be formed of any other suitable material, such as heat resistant plastic. FIG. 19 shows another example of an ergonomical assist system 202 including a hand grip 214 and a forearm support 218. System 202 is coupled to a receptacle, such as a deep fryer basket 200. System 202 may be formed as a unitary structure together with deep fryer basket 200. In other embodiments, system 200 may provide a handle for existing baskets. Handgrip 214 and forearm support 218 may be made of metal, such as stainless steel or other alloys. Handgrip 214 may be formed of a coiled or looped filament, for example coil portions 215 and 216 for grasping by the right and left hand respectively. Portions 215 and 216 of hand grip 214 are formed as separate pieces of looped wire 220 for each portion. Optionally, hand grip 214 may be formed as a single coiled wire piece, or a single piece of wire forming the hand grip that is attached to a single piece of wire forming the arm support, or any other combination of filamentous pieces. Hand grip 214 is narrower at the center 225 of hand grip 214 and wider at the free ends 227 and 228 of hand grip 214. This shape provides for a more ergonomic grip conforming to the palm of the hand when grasping the hand grip so that the area of the hand between the thumb and index finger faces the narrower portion 230 and the outside palm of the hand holds the wider portion 232 of the hand grip. FIG. 19 further shows a filamentous structure, such as wire frame 240, extending from hand grip 214 and leading to forearm support 218. The filamentous structure may be part of the forearm support. Frame 240 may be ergonomically shaped for optimal support of the forearm. Optionally, forearm support 218 may be provided with a support element 244 for distribution of forces over the forearm.

Figure 9:
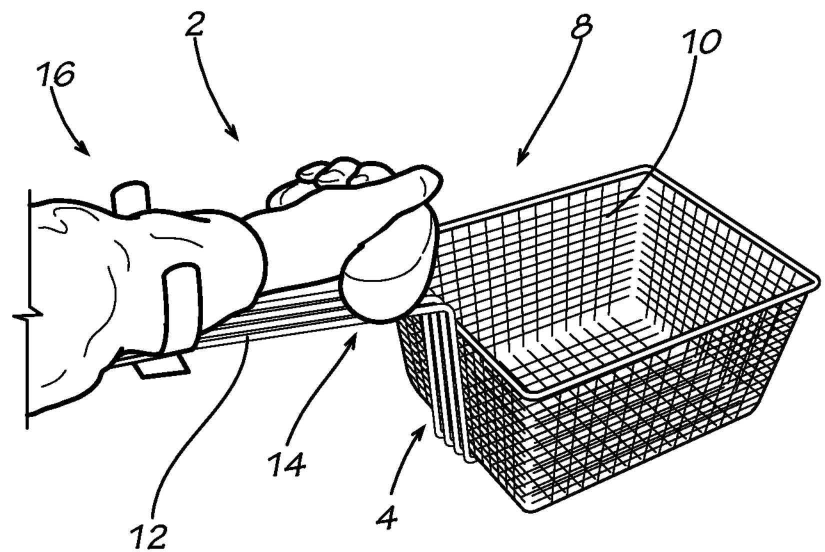
FIGS. 9-11 show perspective views of three different positions of a person's arm while using the system attached to the handle of a deep-fryer basket.
Figure 10:
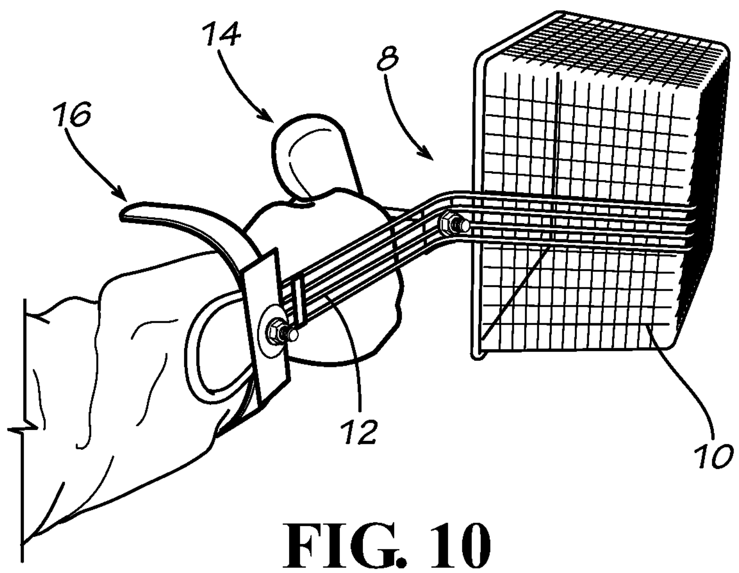
Figure 11:
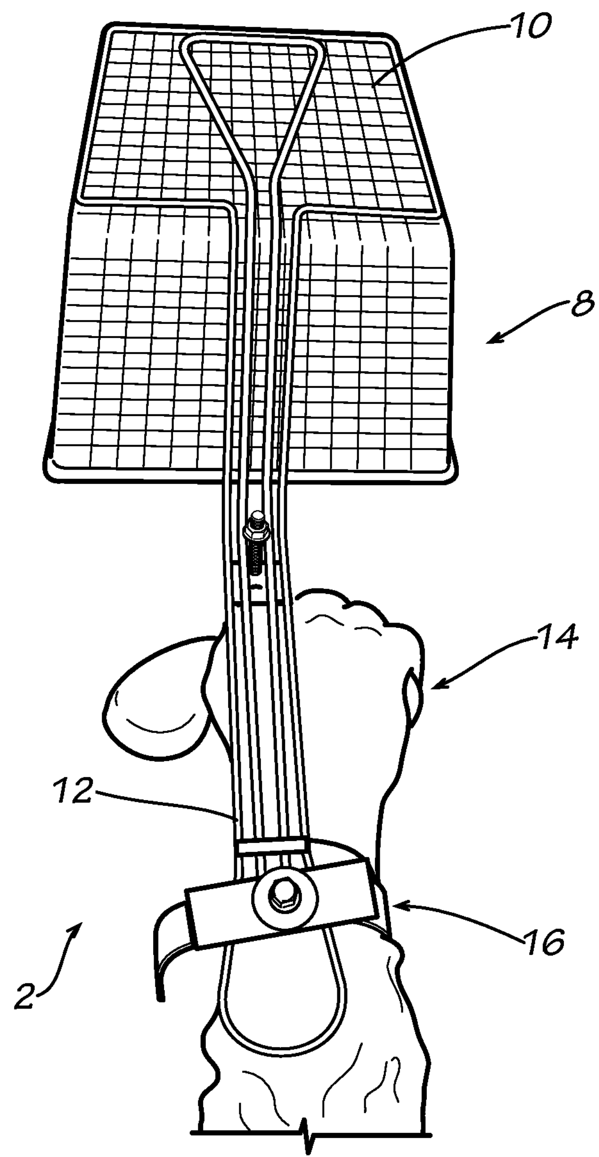
Figure 14:
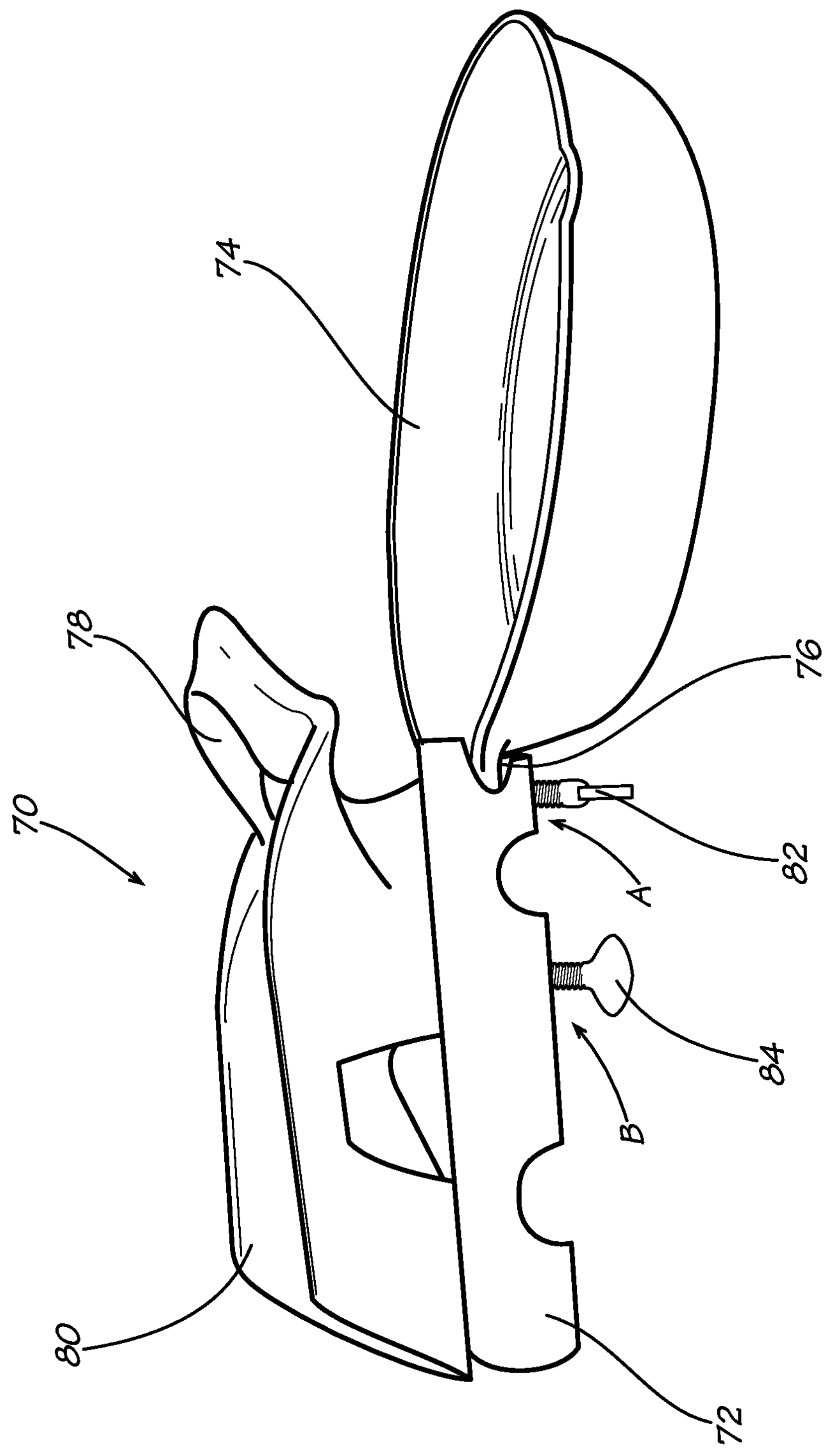
FIGS. 14-17 show different views of another embodiment of an ergonomic system as used in combination with a frying pan.
Figure 15:
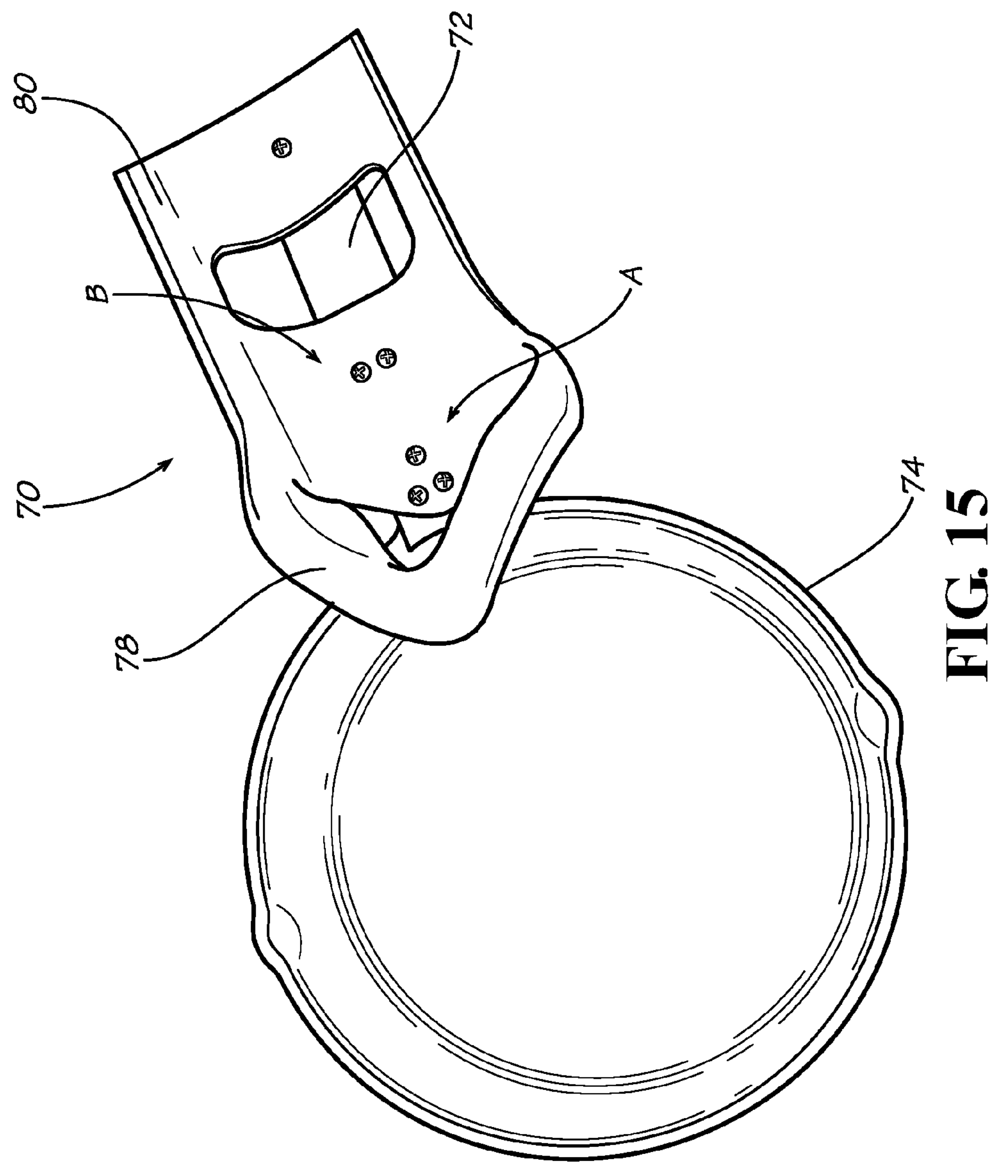
Figure 16:
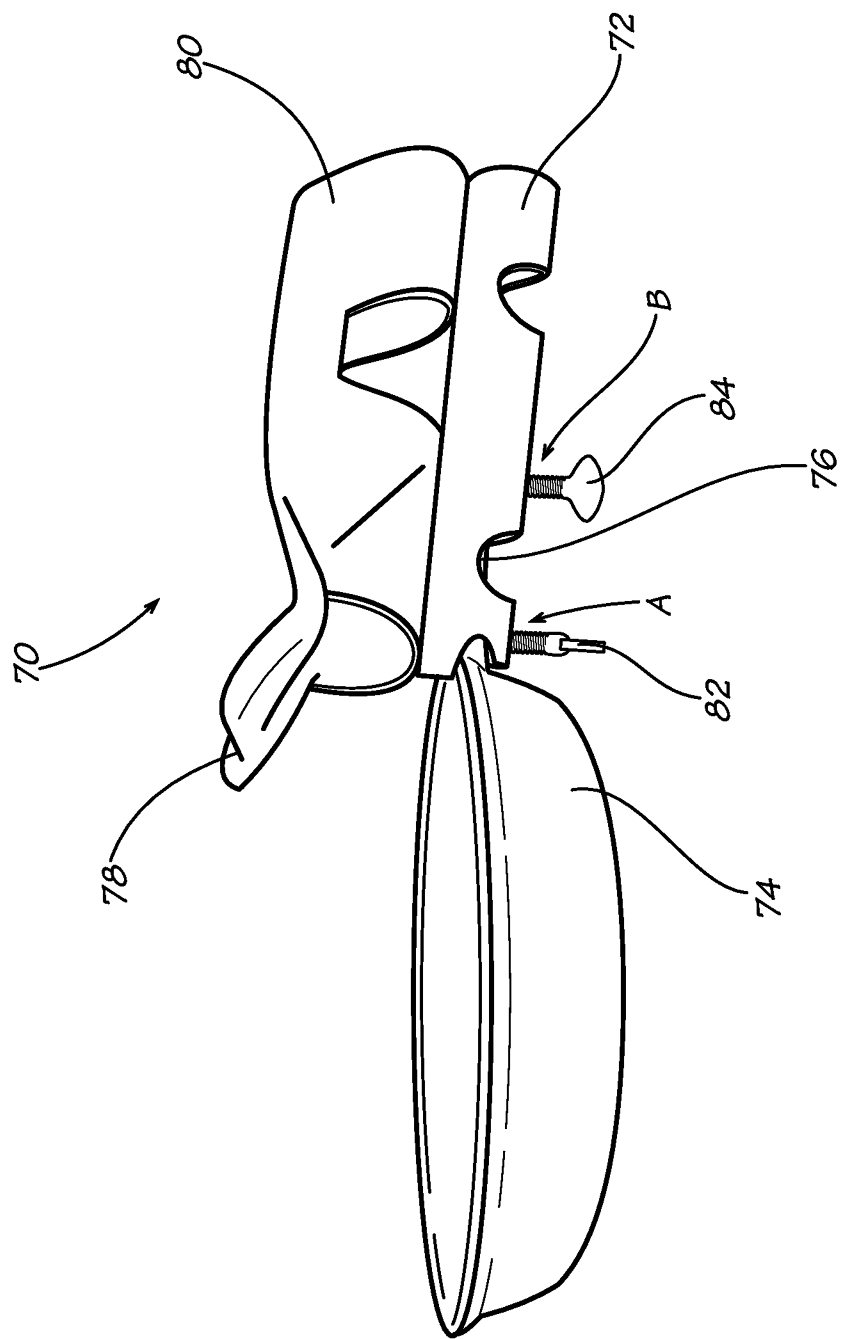
Figure 17:
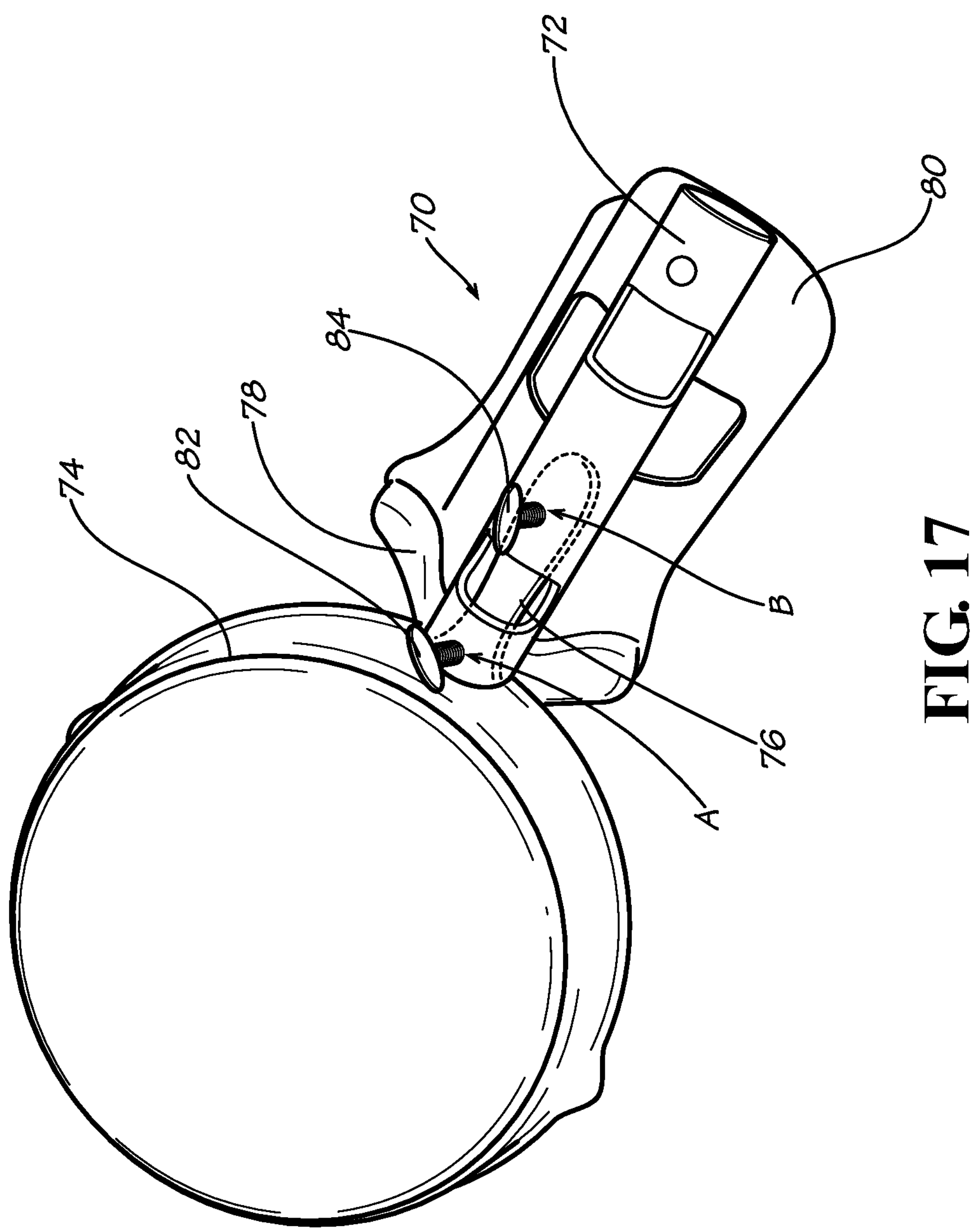

The inventive subject matter further contemplates a method for using such an ergonomic anatomical assist system. FIGS. 9-11 illustrate the movement of the hand and arm when the system is used in combination with a deep-fryer basket 8. In a first position, shown in FIG. 9, a user holds hand grip 14 with the right hand while the forearm is placed in the forearm support 16. In this position, the user is lifting basket 8. In a second position, shown in FIG. 10, the user lifts and turns the hand and arm about 90°, thereby tilting basket 8. In third position, shown in FIG. 11, the hand and arm rotate further, about 90°-180°, to sufficiently turn basket 8 so that the content of basket 8 is unloaded. Hand grip 14 is adapted to hold the hand and the wrist of the person in a neutral or substantially neutral position during all phases of lifting, placing, and dumping the contents of the basket such that the stress on the hand, wrist, and forearm of the person is reduced. Throughout the actions of grasping, lifting, shaking, or turning, the wrist remains in a neutral position and so radial deviation, ulnar deviation, flexion, or extension stresses are reduced. The forces are transferred to the larger arm muscles biceps and brachialis. Furthermore, the angled design of the hand grip further helps prevent the wrist from going into ulnar deviation. This is in contrast to the traditional position in using prior art devices wherein the hand holds the handle of the fryer basket directly, and the hand and wrist are stressed into ulnar deviation and/or flexion while making the movements.

The novel inventive system also allows for individuals with impaired hand strength and function to decrease stress on wrist and forearm when lifting an otherwise awkward object.

The hand grip and forearm support may be made from any suitable material, such as metal, that is sufficiently rigid and strong to support the receptacle with its content. Furthermore, some embodiments may be manufactured from materials that are resistant to the high temperatures, for example when used for frying, and resist the exposure to cooking oils, such as metal or silicone based or heat resistant plastic. As indicated above, in some embodiments, the hand grip and forearm support are formed as a monolithic structure, for example a one-molded piece. In other embodiments, the hand grip and forearm support are distinct pieces interconnected with a connector strip 58, as shown in FIG. 13. In yet another embodiment, the hand grip may form a one piece structure with the fasteners. In addition, the entire hand grip and forearm support structure may be designed as a handle and manufactured as a unitary piece with a container or tool.

The inventive subject matter is further directed to a kit for retrofitting a handled receptacle device with a hand grip and/or forearm support according to the teachings herein. In some embodiments the kit may include different ergonomic systems, for example including different sizes of hand grip and/or forearm support, or a kit including an ergonomic system and accessories, such as hardware.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

The invention claimed is:

1. An ergonomic, anatomical assist system for a receptacle device having a handle extending between a proximal end and a distal receptacle end, and a receptacle positioned distally of the receptacle end of the handle, the anatomical assist system comprising:

a hand grip having a user-graspable portion configured to be coupled to the handle in a transverse orientation, said user-graspable portion further having one leg extending from each of two respective opposed sides of a central region of the user-graspable portion, each of said legs forming an acute angle with said central region, to keep the hand and wrist of the user in a neutral position such that a user's upwardly facing palm can urge against the transversely oriented, user-graspable portion in a generally vertical direction; and a forearm support configured to be coupled to the handle proximally of the hand grip and to cradle around and urge against at least a portion of the user's forearm such that a load of the receptacle device can be applied to at least the user's hand and forearm.

2. The system of claim 1 wherein the forearm support is configured to mount on the handle such that the forearm support resists the load from the receptacle when the user rotates the receptacle through at least 90° relative to an axis of rotation generally parallel to the user's forearm and towards an inverted position while grasping the user-graspable portion.

3. The system of claim 1 wherein at least one of the legs of the hand grip is configured to extend in a proximal direction relative to the handle when the hand grip is coupled to the handle.

4. The system of claim 1 wherein at least one of the legs of the hand grip is configured to extend in a distal direction relative to the handle when the hand grip is coupled to the handle.

5. The system of claim 1 wherein at least one of the legs of the hand grip is configured to extend upwardly relative to the receptacle end of the handle when the hand grip is coupled to the handle.

6. The system of claim 1 wherein each of the legs of the hand grip is configured to extend downwardly relative to the receptacle end of the handle when the hand grip is coupled to the handle.

7. The system of claim 1 wherein, when the hand grip is coupled to the handle, at least one of the legs of the hand grip is configured to be oriented substantially parallel relative to the handle and the receptacle so as to be configured to receive a user's right hand when the user's right wrist is positioned in a generally neutral position.

8. The system of claim 1 wherein, when the hand grip is coupled to the handle, at least one of the legs of the hand grip is configured to be oriented substantially parallel relative to the handle and the receptacle so as to be configured to receive a user's left hand when the user's left wrist is positioned in a generally neutral position.

9. The system of claim 1 wherein one of the legs of the hand grip comprises a left grip portion configured to receive a user's right hand and the other of the legs of the hand grip comprises a right grip portion configured to receive a left hand when the user's respective right wrist or left wrist is positioned in a generally neutral position.

10. The system of claim 1 wherein the hand grip and the forearm support are coupled to each other to thereby constitute a coupled structure, and wherein the coupled structure is configured to mount to the handle.

11. The system of claim 1 wherein the hand grip and the forearm support constitute a one-piece structure.

12. The system of claim 1 wherein a position of the forearm support and a position of the hand grip are adjustable relative to a longitudinal axis of the handle.

13. The system of claim 1 wherein the forearm support has a substantially U-shaped contour.

14. The system of claim 1 wherein the hand grip comprises a heat-resistant material.

15. The system of claim 1 wherein the hand grip and the forearm support comprise stainless steel.

16. The system of claim 1 further comprising a sleeve configured to couple the hand grip and the forearm support to the handle.

17. The system of claim 1 wherein one or both of the hand grip and the forearm support are formed of a filamentous structure.

18. The system of claim 1 wherein the hand grip comprises a coiled or a looped filament.

19. The system of claim 1 wherein each of said legs of the hand grip comprises a filamentous structure that is relatively narrower adjacent said central region of the hand grip and relatively wider adjacent a free end of the hand grip, wherein the free end of the hand grip is configured to be spaced apart from the handle when the hand grip is coupled to the handle.

20. The system of claim 1 wherein the receptacle device comprises a cooking vessel configured as a fry-basket, a fry-pan, or a pasta bin.

21. The system of claim 1, wherein said legs and said central region comprise a unitary construction.

22. The system of claim 1, wherein at least one of the legs is configured to be graspable by a user's left hand when the user's left hand and left wrist are in a neutral position.

23. The system of claim 1, wherein at least one of the legs is configured to be graspable by a user's right hand when the user's right hand and right wrist are in a neutral position.

24. A handled receptacle device, comprising:

a handle extending between a proximal end and a distal end;

a receptacle positioned adjacent the distal end of the handle;

a central portion of a hand grip coupled to the handle proximally of the receptacle and extending transversely relative to the handle, said hand grip having two opposed legs extending from said central portion, each of said legs forming an acute angle with said central portion, to keep the hand and wrist of the user in a neutral position, such that a user's generally upwardly facing palm can urge against the portion of the hand grip in a generally vertical direction relative to the receptacle;

a forearm support coupled to the handle and spaced apart from the hand grip and configured to cradle around and to urge against at least a portion of the user's forearm when the user's upwardly facing palm urges against the hand grip such that the forearm support is configured to braces a load of the receptacle against the user's forearm when the user rotates the receptacle about an axis of rotation generally parallel to the user's forearm towards an inverted position while grasping the grip.

25. The device of claim 24 wherein the handled receptacle device comprises a cooking vessel configured as a fry-basket, a fry-pan, or a pasta bin.

26. A method for making an ergonomic anatomic assist system comprising:

providing a hand grip having a central region and two legs respectively extending from two opposite sides of said central portion, each of said legs forming an acute angle with said central portion;

mounting said hand grip to a handle adjacent a receptacle such that the hand grip extends transversely relative to the handle in a generally horizontal plane such that a user's palm can urge against the hand grip with a palm facing up and opposite the receptacle; and providing a forearm support configured to cradle around at least a portion of the user's forearm, and mounting said forearm support to the handle such that said forearm support is spaced from the hand grip so as to distribute a load of the device over at least two spaced apart anatomical regions of a user, one being at the user's hand and the other along a portion of the user's forearm.

27. The method of claim 26 wherein the receptacle device comprises a cooking vessel configured as a fry-basket, a fry-pan, or a pasta bin.

* * * * *